US007148645B2

(12) United States Patent
Kobashi et al.

(10) Patent No.: US 7,148,645 B2
(45) Date of Patent: Dec. 12, 2006

(54) MOVING BODY, LEGGED MOBILE ROBOT, AND CONTROL PROGRAM

(75) Inventors: Shinichiro Kobashi, Wako (JP); Masaki Aihara, Wako (JP)

(73) Assignee: Honda Môtor Co., Ltd., Tokyo (JP)

( * ) Notice: Subject to any disclaimer, the term of this patent is extended or adjusted under 35 U.S.C. 154(b) by 46 days.

(21) Appl. No.: 11/202,226

(22) Filed: Aug. 12, 2005

(65) Prior Publication Data
US 2006/0038514 A1  Feb. 23, 2006

(30) Foreign Application Priority Data
Aug. 19, 2004  (JP)  ............................. 2004-239051

(51) Int. Cl.
B25J 13/00  (2006.01)
(52) U.S. Cl. ............................. 318/568.12; 318/568.2; 318/568.24; 901/1
(58) Field of Classification Search ................ 318/105, 318/563, 565, 568.11, 568.12, 568.2, 568.22, 318/568.24; 901/1
See application file for complete search history.

(56) References Cited
U.S. PATENT DOCUMENTS
4,475,160 A * 10/1984 Inaba .................... 318/568.16

5,363,474 A * 11/1994 Sarugaku et al. ........... 700/256
6,208,105 B1 * 3/2001 Kato et al. ............. 318/568.24
6,377,869 B1 * 4/2002 Watanabe et al. .......... 700/245

FOREIGN PATENT DOCUMENTS
JP   2001-022446   1/2001
JP   2003-211379   7/2003

* cited by examiner

*Primary Examiner*—Bentsu Ro
(74) *Attorney, Agent, or Firm*—Squire, Sanders & Dempsey LLP

(57) ABSTRACT

According to a legged mobile robot of the present invention, a variable measuring portion 101 measures the changing amount of a secondary desired angle $\theta_{T2}$, namely, of the newest primary desired angle $\theta_{T1}$ that is received by a first sub-control unit 121 as a variable $\delta$. When a determining portion 102 determines that an absolute value of the variable $\delta$ exceeds a threshold $\epsilon$, a correcting portion 103 corrects a motor current I so as to inhibit the changing amount of the motor current I. Thereby, even when an abnormality is temporarily generated in the communication between a main control unit 110 and a first sub-control unit 121 via a first communication line and the absolute value of the variable $\delta$ exceeds a threshold $\epsilon$, the current supply I to a motor 131 is inhibited from changing rapidly.

13 Claims, 6 Drawing Sheets

MOVING BODY, LEGGED MOBILE ROBOT, AND CONTROL PROGRAM

BACKGROUND OF THE INVENTION

1. Field of the Invention

The present invention relates to a moving body, which moves due to a motor as a source of power, a robot moving by actuating a plurality of legs using a motor as a source of power, and a program to give various controlling functions to each of the moving body and the robot.

2. Description of the Related Art

Conventionally, the operation of this moving body is controlled in such a manner that a main control unit transmits a desired angle of a joint of a moving body such as an arm robot to be driven by a motor to a motor control unit via a communication line, and the motor control unit controls power supply to the motor so that a joint angle of the moving body coincides with this desired angle.

In addition, a technical method to detect that the current supply to the motor as the source of power of a leg type moving robot is not in a predetermined range as an abnormality of this motor is proposed (for example, refer to column [0102], JP-A-2003-211379). Further, according to the robot having an arm moving due to a servomotor as a source of power, a technical method to variably set a threshold of the motor current in accordance with a motor commanding value in order to detect the abnormality such as the excessive current supply to the motor or the like with a high degree of accuracy is proposed (for example, refer to column [0005], JP-A-2001-022446).

However, due to a disturbance noise incorporation or the like in a network inside the robot, in the case that an abnormality such that a communication of the desired angle from the main control unit to the motor control unit is temporarily interrupted is generated, the following inconvenience occurs. This inconvenience will be described below with reference to FIG. 6.

If this communication is interrupted at time $t_1$, as shown in FIG. 6A, even as a primary desired angle $\theta_{T1}$ to be set by the main control unit has been continuously changed, as shown in FIG. 6B, a secondary desired angle $\theta_{T2}$ stored and held by the motor control unit is maintained at a value $\theta_{T2}(t_1)$ and at time $t_1$.

After that, when this communication is restored at time $t_2$, as shown in FIG. 6B, in the secondary desired angle $\theta_{T2}$, a step wise change $\delta\theta_T(=\theta_{T2}(t_2)-\theta_{T2}(t_1))$ occurs. In this time, in order to resolve the change $\delta\theta_T$ and coincide an actual angle $\theta$ with the secondary desired angle $\theta_{T2}$, as shown in FIG. 6C, a motor current I is changed into a shape like a pulse with a height $\delta I$ from time $t_2$ to time $t_3$. Thereby, as shown in FIG. 6D, the actual angle $\theta$ is controlled so as to coincide with the primary desired angle $\theta_{T1}$ that is set by the main control unit.

Since the current supply to the motor is changed into a shape like a pulse in this way, a moving pattern of the robot cannot be expected and it is feared that the behavior of the robot after that suffers from an adverse affect. In addition, determining that an abnormality occurs in the power supply to the motor by the control system, it is feared that the power supply to the motor is stopped and the operation of the robot is stopped.

SUMMARY OF THE INVENTION

Therefore, an object of the present invention is to provide a moving body or a robot capable of appropriately controlling the behavior thereof even when an abnormality temporarily occurs in a communication of a control unit for controlling the operation of the motor, and a program to give this control function to the moving body or the robot.

The present invention relates to a moving body equipped with a motor as a source of power, an output measuring means for measuring an output of the motor, and a control system having a plurality of control units to execute functions by a power supplied from a control system power source via a control system electric line, the control system including, as the control units, a main control unit for sequentially setting a primary desired output of the motor; and a first sub-control unit for receiving a primary desired output from the main control unit via a first communication line, storing and holding the newest primary desired output as a secondary desired output, and adjusting a power supplied from a driving system power source to the motor via a driving system electric line so that the output of the motor coincides with the newest secondary desired output.

In the case that the control system electric line, a driving system electric line, and a first communication line or the like are arranged at a joint of the moving body, it is preferable that lines of this joint portion are organized as much as possible in order to secure mobility of the joint and downsize this joint portion. Accordingly, the driving system electric line connecting the driving system power source and the motor, the control system electric line connecting the control system power source and the first sub-control unit, and the first communication line connecting the main control unit and the first sub-control unit may be lined close to each other. In this case, due to occurrence of the noise from the driving system electric line and the external force given to the first communication line by the moving of this joint portion or the like, it is highly likely that the communication about the desired output of the motor from the main control unit to the first sub-control unit is interrupted as described above. Therefore, it is highly necessary that the behavior of the moving body is appropriately controlled.

Accordingly, in order to solve the problem, the moving body according to the present invention comprise variable measuring means for measuring the changing amount of the secondary desired output or a deviation between an output of the motor measured by the output measuring means and the newest primary desired output set by the main control unit as a variable; determining means for determining whether or not an absolute value of the variable measured by the variable measuring means exceeds a threshold; and correcting means for correcting a power supply from the driving system power source to the motor to be adjusted by the first sub-control unit after the determining means determines that the absolute value of the variable exceeds the threshold in order to inhibit the changing amount of the power supply.

According to the control system of the moving body of the present invention, if the absolute value of the changing amount of the second desired output or the deviation between the output of the motor measured by the output measuring means and the newest primary desired output set by the main control unit (the variable) is largely changed so as to exceed the threshold, the power supply to the motor after this change is corrected so that the changing amount of this power supply is decreased. Thereby, even in the case that an abnormality is temporarily generated in the communication between the main control unit and the first sub-control unit via the first communication line and the absolute value of the variable exceeds the threshold, the rapid change of power supply to the motor is inhibited.

Therefore, according to the moving body of the present invention, even in the case that an abnormality is temporarily generated in the communication between the main control unit and the first sub-control unit, it is possible to appropriately control the behavior of the moving body.

In addition, according to the moving body of the present invention, the correcting means sets correction duration of the power supply to the motor in accordance with the volume of the variable measured by the variable measuring means.

According to the moving body of the present invention, in order to certainly inhibit the changing amount of the power supply to the motor in accordance with the volume of the changing amount of the secondary desired output, namely, the newest desired output of the motor owned by the first sub-control unit, the power supply to this motor can be corrected for a sufficiently long period of time.

Moreover, according to the moving body of the present invention, the correcting means sets a correction amount of the power supply to the motor based on the absolute value of the variable measured by the variable measuring means.

According to the moving body of the present invention, the power supply may be controlled so that the change of power supply to the motor is inhibited based on the absolute value of the variable, that is, the degree of the change of the secondary desired output.

Further, the moving body of the present invention comprises notification means for notifying a user of a determination result by the determining means that the absolute value of the variable exceeds the threshold.

According to the moving body of the present invention, a determination result by the determining means that the absolute value of the variable exceeds the threshold is noticed to the user. Accordingly, it is possible to make the user be aware of the abnormality generated in the first communication line connecting the main control unit and the first sub-control unit and to prompt the user to care for solving this abnormality such as adjustment of the wiring condition of this first communication line.

In addition, the moving body of the present invention comprises, as a control unit, a second sub-control unit for receiving an output signal in accordance with the physical amount of the moving body from the sensor and transmitting the output signal to the main control unit via a second communication line; wherein the main control unit receives the output signal of the sensor from the second sub-control unit, stores and holds the physical amount in accordance with the output signal, and sequentially sets the primary desired output based on the newest physical amount.

According to the moving body of the present invention, since the primary desired output is sequentially set based on the physical amount of the moving body by the main control unit, in view of this physical amount, it is possible to control the operation of the motor and the moving of the moving body appropriately.

In addition, when the first and second communication lines are lined close to the electric line or the like at the joint portion of the moving body in order to secure mobility of this joint portion, it is highly likely that the abnormality is generated not only in the communication of the first communication line but also in the communication of the second communication line. When the abnormality is generated in the communication of the second communication line, it is likely that the newest physical amount stored and held by the main control unit is largely changed. Therefore, even if the communication of the first communication is normal, it is likely that the primary desired output to be set by the main control unit is largely changed.

However, in this case, as same as the case that the abnormality is generated in the first communication line, the secondary desired output stored and held by the first sub-control unit is largely changed, as described above, the power supply to the motor is corrected so that the changing amount of this power supply is inhibited. Accordingly, even when the abnormality is generated in the communication of the second communication line, it is possible to appropriately control the moving of the moving body.

The present invention relates to a legged mobile robot equipped with a base body, a plurality of legs extending from the base body, a motor as a source of power of the plurality of legs, a current measuring means for measuring a current of the motor, a control system power source, and a control system having a plurality of control units to execute functions by a power supplied from the control system power source via a control system electric line, the control unit including a main control unit for sequentially setting a primary desired current of the motor, and a first sub-control unit for receiving a primary desired current from the main control unit via a first communication line, storing and holding the newest primary desired current as a secondary desired current, and adjusting a current supplied from a driving power source to the motor via a driving system electric line so that the current of the motor coincides with the newest secondary desired current.

In the case that the first communication line or the like is lined close to the joint portion of the leg for walking of the robot, the first communication line is shaken by a floor reaction caused when the leg connects to ground and it is also likely that the abnormality is generated in the communication of this first communication line. As a result, it is highly necessary that the walking operation of the robot is appropriately controlled.

Therefore, in order to solve the above problem, the legged mobile robot of the present invention comprises variable measuring means for measuring the changing amount of the secondary desired current or a deviation between a current measured by a current measuring means and the newest primary desired current set by the main control unit as a variable, determining means for determining whether or not an absolute value of the variable measured by the variable measuring means exceeds a threshold, and correcting means for correcting a current from the driving system power source to the motor to be adjusted by the first sub-control unit after the determining means determines that the absolute value of the variable exceeds the threshold in order to inhibit the changing amount of the current.

According to the legged mobile robot of the present invention, even when the communication abnormality is generated due to the floor reaction generated when the leg connects to ground or an electric potential at a place where the leg connects ground or the like, the current provided to the motor is inhibited from changing excessively, so that it is possible to appropriately control the movement of the leg using the motor as a power source, and the walking operation of the robot from the viewpoint of the stability of the walking.

In order to solve the above-described problem, a control program according to the first embodiment of the present invention, which provides the correcting function to the robot, comprises a variable measuring function for measuring the changing amount of the secondary desired output as a variable; a determining function for determining whether or not an absolute value of the variable measured by the variable measuring function exceeds a threshold; and a correcting function for correcting a power supply from the driving system power source to the motor to be adjusted by the first sub-control unit after the determining function determines that the absolute value of the variable exceeds the threshold in order to inhibit the changing amount of the power supply.

Further, the control program according to the first embodiment of the present invention provides a function for setting correction duration of the power supply to the motor in accordance with the volume of the variable measured by the variable measuring function as a correcting function to the moving body.

Moreover, the control program according to the present invention provides a function for setting correction amount of the power supply to the motor based on the absolute value of the variable measured by the variable measuring means as a correcting function to the moving body.

Still further, the control program according to the present invention provides a notification function for notifying a user of a determination result by the determining means that the absolute value of the variable exceeds the threshold to the moving body.

In addition, the control program according to the first embodiment of the present invention provides the above-described functions to the moving body, which comprises a second sub-control unit for receiving an output signal in accordance with the physical amount of the moving body from the sensor and transmitting the output signal to the main control unit via a second communication line; wherein the main control unit receives the output signal of the sensor from the second sub-control unit, stores and holds the physical amount in accordance with the output signal, and sets the primary desired output based on the newest physical amount.

In addition, the control program according to the present invention provides the variable measuring function, the determining function, and the correcting function to the first sub-control unit to the moving body.

In order to solve the problems, the control program according to the second embodiment of the present invention, which provides the correcting function to the legged mobile robot, comprises variable measuring function for measuring the changing amount of the secondary desired current or a deviation between a current measured by a current measuring means and the newest primary desired current set by the main control unit as a variable, determining function for determining whether or not an absolute value of the variable measured by the variable measuring means exceeds a threshold, and correcting function for correcting a current from the driving system power source to the motor to be adjusted by the first sub-control unit after the determining means determines that the absolute value of the variable exceeds the threshold in order to inhibit the changing amount of the current.

DESCRIPTION OF THE PREFERRED EMBODIMENTS

The embodiment of a moving body, a legged mobile robot, and a control program and a control program will be described below with reference to the drawings.

Figure 1:
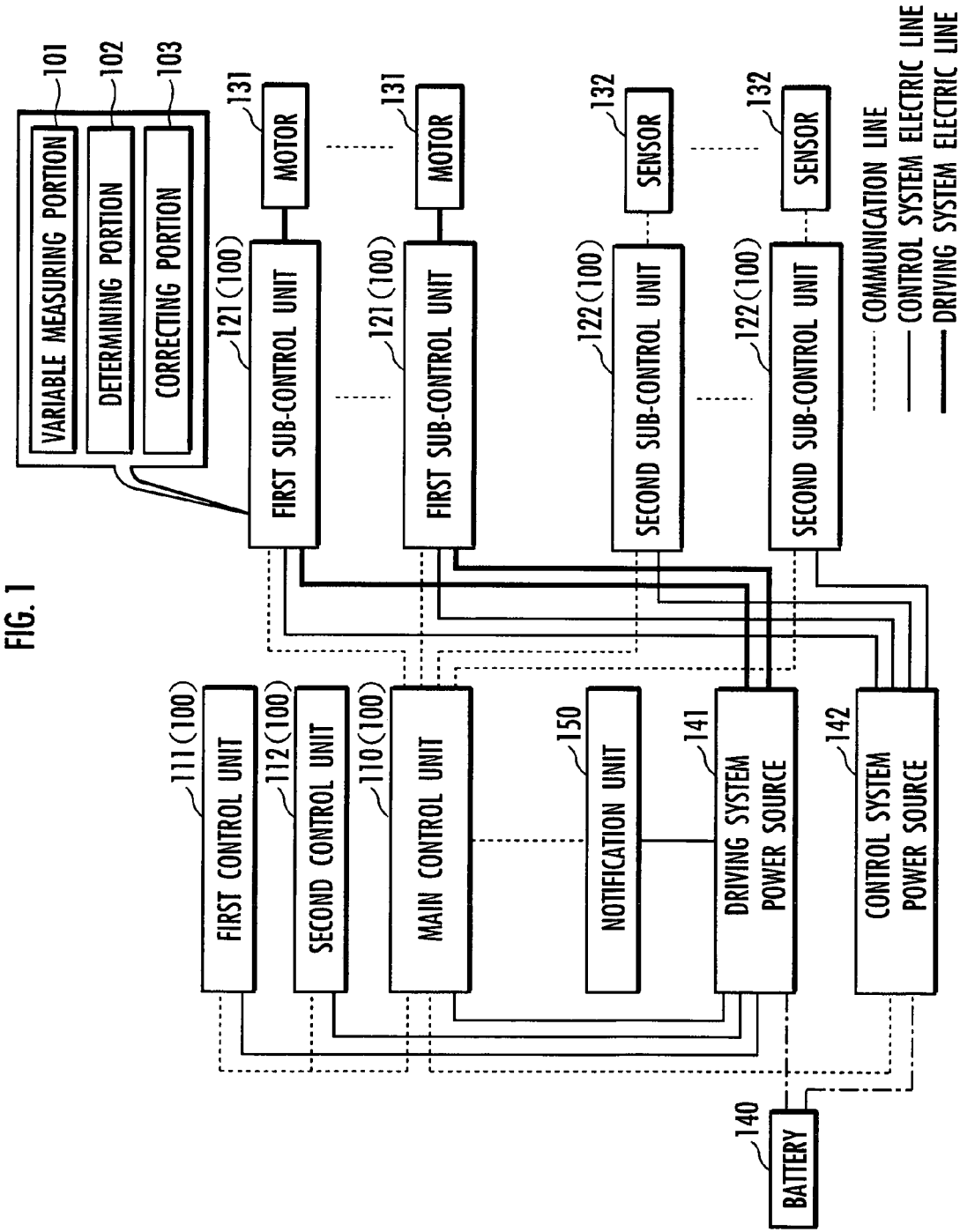
FIG. 1 is an explanatory block diagram of a control system according to an embodiment of the present invention.

The control system shown in FIG. 1 is provided with a plurality of control units 100 and its control object is a leg type moving robot 200 shown in FIG. 2 (hereinafter, referred to as "a robot").

The plurality of control units 100 includes a main control unit 110, a first control unit 111, a second control unit 112, a first sub-control unit 121, and a second sub-control unit 122. The control system is provided with a sensor 132, a motor 131, a battery 140, a control system power source 142, a driving system power source 141, and a notification unit 150. Each control unit 100 is configured by a CPU, a ROM, a RAM, a signal input circuit, and a signal output circuit or the like as a hardware. In addition, the first sub-control unit 121 is configured by the CPU or the like as a hardware and "the control program" of the present invention as a software to supply "a variable measuring function", "a determination function" and "a correction function" to these CPU or the like. Further, the notification unit 150 is configured by the CPU or the like as a hardware and "the control program" of the present invention as a software to supply "a notification function" to these CPU or the like.

The main control unit 110, the first control unit 111, and the second control unit 112 are connected to communicate with each other via a communication line (shown by a broken line, the followings are the same). In addition, the main control unit 110 and the first sub-control unit 121 are connected to communicate with each other via "a first communication line". Further, the main control unit 110 and the second sub-control unit 122 are connected to communicate with each other via "a second communication line". The second sub-control unit 122 and the sensor 132 are connected to communicate with each other via a communication line.

In addition, the battery 140, and each of the control system power source 142 and the driving system power source 141 are connected by an electric line (shown by a dashed line), respectively. Further, the driving system power source 141 and the motor 131 are connected via a driving system electric line (shown by a bold line) to be routed through the second sub-control unit 122. In addition, the control system power source 142, and the main control unit 110, the first control unit 111, the second control unit 112, the first sub-control unit 121, and the second sub-control unit 122 are connected via a control system electric line (shown by a solid line), respectively.

The main control unit 110 is housed in an upper body (base body) 240 of the robot 200 to set a primary desired angle (a primary desired output) $\theta_{T1}$ of each joint such as a hip joint 211, and a knee joint 212 or the like. In addition, the main control unit 110 may control the walking moving or the like of the robot 200 through the communication or the like to each of the first sub-control unit 121 and the second sub-control unit 122.

The first control unit 111 and the second control unit 112 are arranged on a lower limb (leg) 210 and an upper limb 220 of the robot 200, respectively, and they may transmit the data or the like to specify the desired operation of the robot 200 to the main control unit 110.

The first sub-control unit 121 is arranged on the lower limb 210 and the upper limb 220 of the robot 200, may receive the primary desired angle $\theta_{T1}$ set by the main control unit 110 via the first communication line, and may store and hold it as a secondary desired angle (a secondary desired output) $\theta_{T2}$. In addition, in accordance with the control block diagram shown in FIG. 3, the first sub-control unit 121 may control the operation of the motor 131 by controlling the power supply from the driving system power source 141 to the motor 131. Specifically, by multiplying a deviation between the desired angle $\theta_T$ of each joint (the secondary desired angle $\theta_{T2}$) and the actual angle $\theta$ by a positional gain Kp, a desired angle speed $\omega_T$ (=Kp($\theta_T$–$\theta$)) is defined. In addition, by multiplying a deviation between the desired angle speed $\omega_T$ and an angle speed $\omega$ by a speed gain $K_v$, a desired torque $T_T$ (=$K_v$($\omega_T$–$\omega$)) is defined. Further, by multiplying a deviation between the desired torque $T_T$ and a joint torque T by a current gain Ki, a desired current $I_T$(=Ki($I_T$–I)) is defined. Then, a current supply I from the driving system power source 141 to the motor 131 is adjusted so that the desired current $I_T$ coincides with the motor 131. Thereby, the joint angle $\theta$ to be driven by the motor 131 is controlled so as to coincide with the desired angle $\theta_T$. In this control block diagram, reference marks L, R, Kt, and Jm represent an inductance, an inner resistance, an inversed power constant, and an inertia of the motor 131, respectively.

In addition, the first sub-control unit 121 is provided with a variable measuring portion 101, a determining portion 102, and a correcting portion 103, respectively.

The variable measuring portion 101 measures the changing amount $\delta$ of the secondary desired angle $\theta_{T2}$, namely, of the newest primary desired angle $\theta_{T1}$ that is received by the first sub-control unit 121 from the main control unit 110 as a variable. The determining portion 102 determines whether or not the absolute value of the variable $\delta$ measured by the variable measuring portion 101 exceeds a threshold $\epsilon$. The correcting portion 103 corrects the current supply (power supply) from the driving system power source 141 to the motor 131 to be adjusted by the first sub-control unit 121 so that the changing amount of this current is inhibited after the determining portion 102 determines that the absolute value of the variable $\delta$ exceeds the threshold $\epsilon$.

The second sub-control unit 122 is arranged on the lower limb 210 and the upper limb 220 of the robot 200, and upon receiving a measuring signal to be outputted from the sensor 132, transmits the same to the main control unit 110. In addition, the second sub-control unit 122 adjusts the sensor 132, for example, a calibration (adjustment of a zero point) through the communication to the sensor 132.

The motor 131 is arranged on the lower limb 210 and the upper limb 220, and gives the turning force to the hip joint 211, the knee joint 212, and an ankle joint 213 of the lower limb 210; a shoulder joint 221, an elbow joint 222, and an intercarpal joint 223 of the upper limb 220; and three interphalangeal joints 231, 232, and 233 of a hand portion 230; and a neck joint 242 of the upper body 240; directly from this output axis via its output axis, or indirectly via a power transfer mechanism (not illustrated) having a line and a pulley or the like. The motor 131 may give the turning force to the joint having freedom of moving other than the above-described joints.

The sensor 132 includes a six-axes sensor arranged at the ankle joint 213 of the robot for outputting a measurement signal in accordance with a translation force in orthogonal three-axes directions of the ankle joint 213 and a moment around the three axes, a rotary encoder for outputting a measuring signal in accordance with the rotational angles of the hip joint 211 and the knee joint 212, and a current sensor for measuring the current supply (the power supply) to the motor 131 or the like.

The battery 140 is housed in the upper body 240 and it is configured by a Ni-Zn battery, a Ni-MH battery, and a lithium ion battery or the like. The driving system power source 141 is housed in the upper body 240 and supplies the power supplied from the battery 140 to the motor 131 via the driving system electric line (refer to a bold line in FIG. 1). The control system power source 142 is housed in the upper body 240 and supplies the power supplied from the battery 140 to each control unit 100 via the control system electric line (refer to a solid line shown in FIG. 1).

The notification unit 150 is arranged on a rear face of the upper body 240 of the robot 200 and the determination result by the determining portion 102 that the absolute value of the variable $\delta$ exceeds the threshold $\epsilon$ is displayed in a code or a message or the like.

In the robot 200, it is preferable that lines of the joint portion are organized as much as possible in order to secure mobility of the joint and downsize this joint portion. Therefore, at the portion of the hip joint 211, a communication line, the first and second communication lines (refer to a broken line in FIG. 1) that connects the main control unit 110 housed in the upper body 240, and the first control unit 111, the first sub-control unit 121, and the second sub-control unit 122 arranged in the lower limb 210 (the leg for walking), respectively; the driving system electric line (refer to a broken line in FIG. 1) that connects the driving system power source 141 housed in the upper body 240 and the motor 131 arranged in the lower limb 210, respectively; and the control system electric line (refer to a solid line in FIG. 1) that connects the control system power source 141 housed in the upper body 240, and the first sub-control unit 121 and the second sub-control unit 122 arranged in the lower limb 210, respectively, are lined close to each other. The communication lines or the like are also lined close to each other at the portions of the knee joint 212 and the shoulder joint 221.

Subsequently, the functions of the above-described control system will be described below with reference to FIGS. 4 and 5.

Figure 6A:
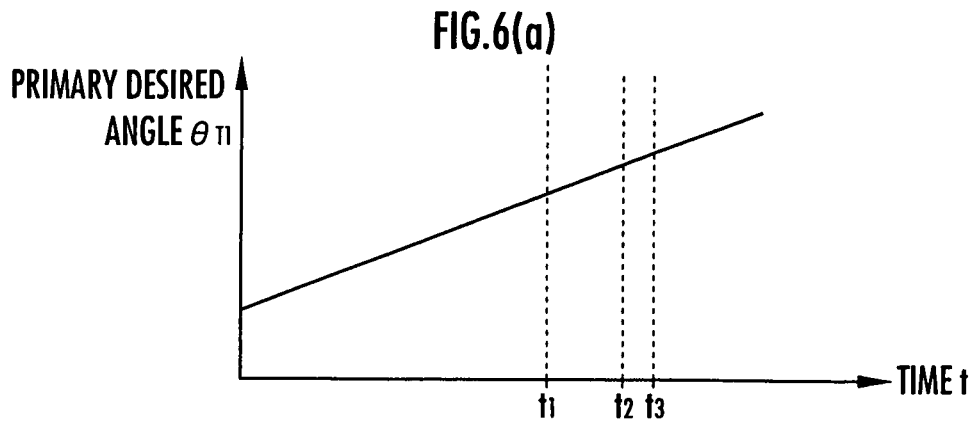
FIG. 6 is an explanatory diagram of a conventional method for controlling a motor current.

Any one or both of the first control unit 111 and the second control unit 112 transmits the desired operation of the robot 200 such as the walking operation, the running operation, and the operation of sitting on a chair or the like to the main control unit 110 via the communication line. In addition, receiving an output signal in accordance with the joint angle $\theta$ and the physical amount of the current I or the like from the sensor 132, the second sub-control unit 122 transmits the output signal to the main control unit 110 via the second communication line. Storing and holding the physical amount in accordance with the desired operation and the output signal of the sensor 132 in its memory, the main control unit 110 sets the primary desired angle $\theta_{T1}$ of each joint such as the hip joint 211 and the knee joint or the like on the basis of the newest desired operation and the physical amount (see FIG. 6A).

Then, the primary desired angle $\theta_{T1}$ set by the main control unit 110 is transmitted from the main control unit 110 to the first sub-control unit 121 via the first communication line. The first sub-control unit 121 stores and holds the newest primary desired angle $\theta_{T1}$ received from the main control unit 110 in its memory as the secondary desired angle $\theta_{T2}$.

Figure 3:
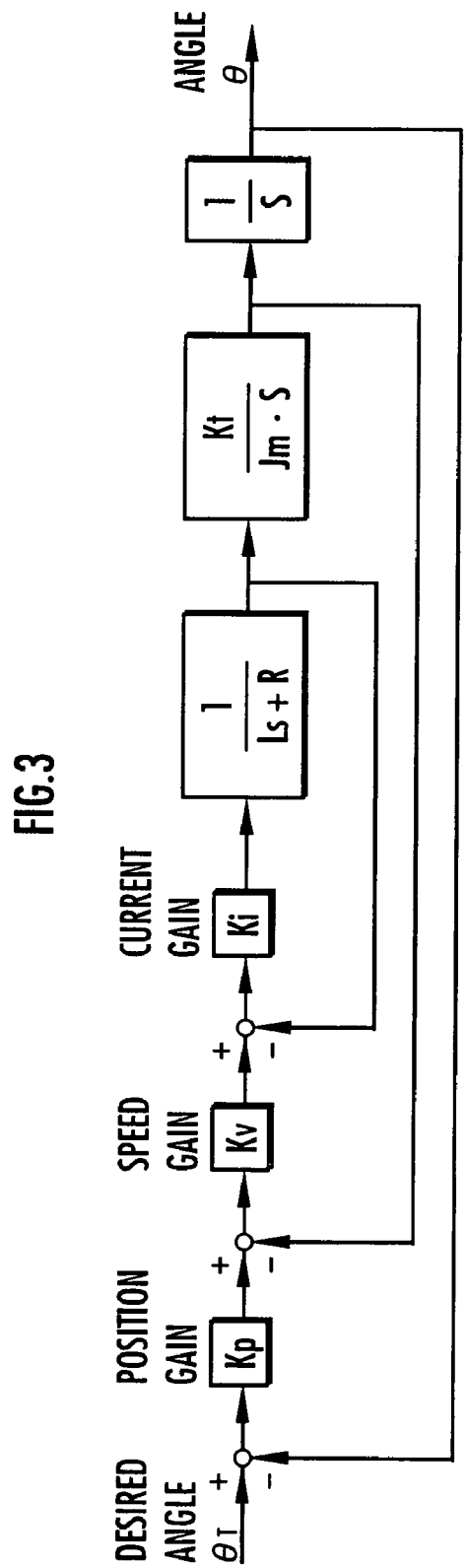
FIG. 3 is a control block diagram of the operation of a motor.

Then, in accordance with the control block diagram shown in FIG. 3, the first sub-control unit 121 controls the current supply I to the motor 131 so that the angle $\theta$ of each joint coincides with the secondary desired angle $\theta_{T2}$.

Figure 4:
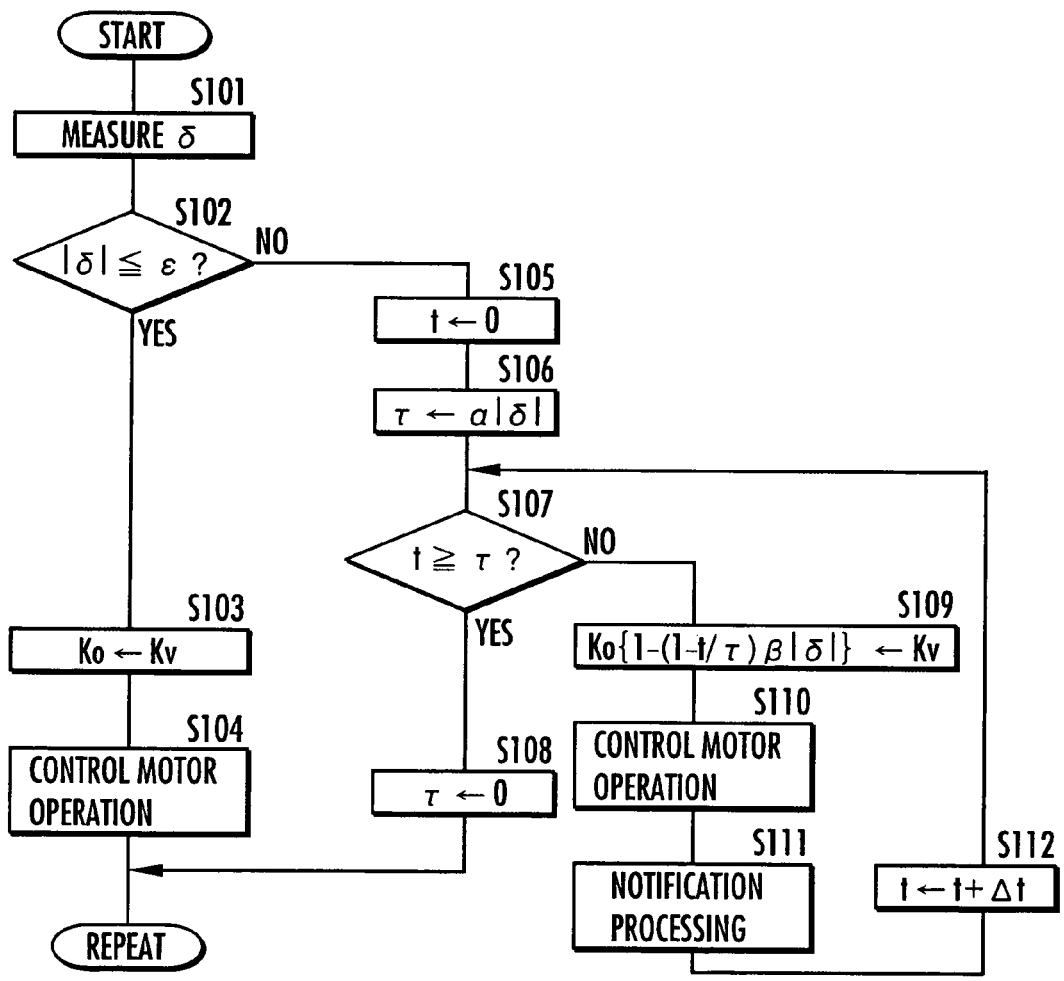
FIGS. 4 to 5 are functional explanatory diagrams of the control system according to an embodiment of the present invention.

During controlling the current supply I to the motor 131, the variable measuring portion 101 periodically measures the changing amount $\delta$ of the secondary desired angle $\theta_{T2}$ as a variable (refer to S101 in FIG. 4). The variable $\delta$ will be decided according to the following mathematical expression (1).

$$\delta = \int dt \cdot \delta\theta/\delta t \qquad (1)$$

Figure 6B:
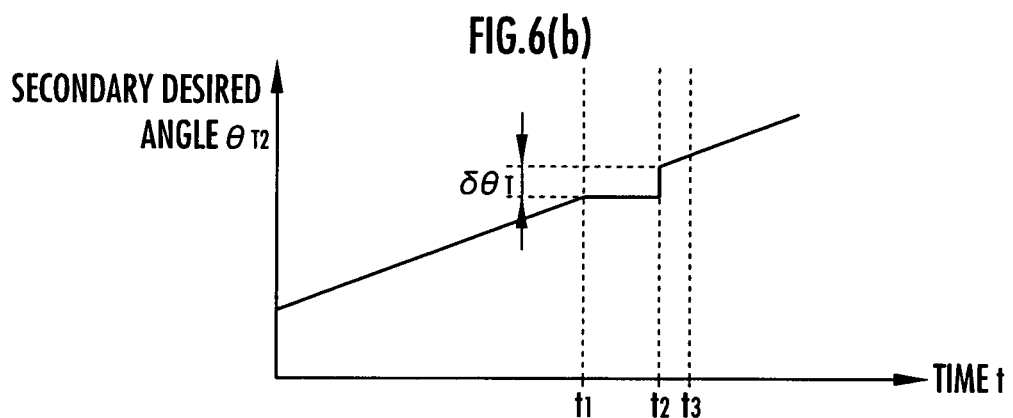

In the mathematical expression (1), time integration is carried out in a measurement period of the variable measuring portion 101. If the secondary desired angle $\theta_{T2}$ is changed in a step-like shape as shown in FIG. 6B, the variable $\delta$ is measured to be "$\delta\theta_{T2}$" since $\delta\theta/\delta t$ in the mathematical expression (1) is similar to $\delta\theta_{T2}\cdot\delta(t)$ (a delta function).

In addition, the determining portion 102 may determine whether or not the absolute value of the variable $\delta$ exceeds the threshold E (refer to S102 in FIG. 4).

If the determining portion 102 determines that the absolute value of the variable $\delta$ is not more than a threshold $\epsilon$ (refer to S101 . . . YES in FIG. 4), the speed gain $K_v$ in the control block diagram shown in FIG. 3 is set at its initial value $K_0$ (refer to S103 in FIG. 4). Then, the first sub-control unit 121 controls the operation of the motor 131 by controlling the current supply I from the driving system power source 141 to the motor 131 using this speed gain $K_v$ (refer to S104 in FIG. 4). Thereby, the operation of the robot 200 is controlled so that each joint angle $\theta$ thereof coincides with the secondary desired angle $\theta_{T2}$.

On the other hand, when the determining portion 102 determines that the absolute value of the variable $\delta$ exceeds the threshold $\epsilon$ (refer to S102 . . . NO in FIG. 4), elapsed time t from the determination time measured by a timer (not illustrated) is set to 0 (refer to S105 in FIG. 4), and the correcting portion 103 sets the product of the absolute value of a positive coefficient a and that of the variable $\delta$ as a corrected duration $\tau$ (refer to S106 in FIG. 4). In addition, in the case that time t measured by timer is less than the corrected duration $\tau$ (refer to S107 NO in FIG. 4), the correcting portion 103 corrects the speed gain $K_v$ in accordance with the following mathematical expression (2) (refer to S109 in FIG. 4).

$$K_v = K_0\{1-(1-t/\tau)\beta|\delta|\}, \text{ wherein } \beta \text{ is a positive coefficient} \qquad (2)$$

Then, the first sub-control unit 121 controls the operation of the motor 131 by controlling the current supply I from the driving system power source 141 to the motor 131 using this speed gain $K_v$ (refer to S110 in FIG. 4). In addition, the notification unit 150 displays that the abnormality is generated in the communication of the first communication line or the like (refer to S111 in FIG. 4). Further, time t is increased by a predetermined time $\Delta t$ such as 5 ms (refer to S112 in FIG. 4), and the processing such as the correction of the above-described gain coefficient $K_v$ (refer to S109 in FIG. 4) and the control of the motor operation based on the corrected gain coefficient $K_v$ (refer to S110 in FIG. 4) is carried out until this time t becomes the corrected duration $\tau$.

In addition, when time t attains the corrected duration $\tau$ (refer to S107 . . . YES in FIG. 4), the corrected duration $\tau$ is set to 0 (refer to S108 in FIG. 4), and the processing after measurement of the changing amount $\delta$ of the secondary desired angle $\theta_{T2}$ (refer to S101 in FIG. 4) are repeatedly carried out.

Figure 5A:
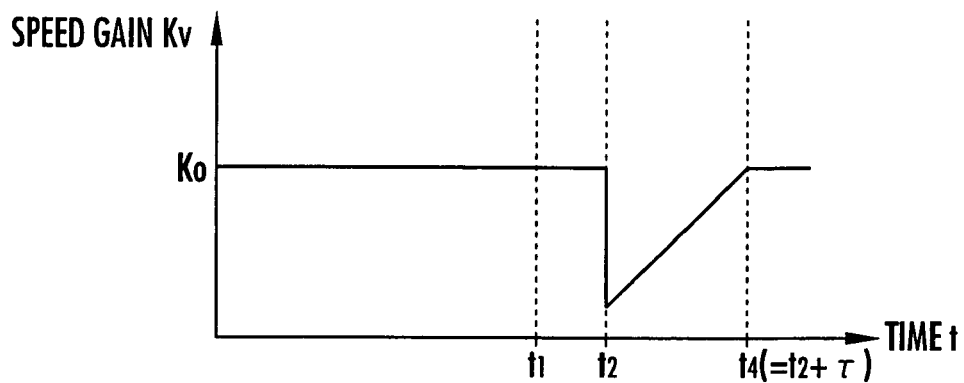

As shown in FIG. 6B, when the secondary desired angle $\theta_{T2}$ is changed into a step-like shape at time $t_2$, if the variable $\delta$ measured by the variable measuring portion 101 exceeds the threshold $\epsilon$, as shown in FIG. 5A, the speed gain $K_v$ is gradually increased after lowering in a step-like shape at time $t_2$ and when the corrected duration $\tau$ has lapsed from time $t_2$, the speed gain $K_v$ is returned to the initial value $K_0$.

Figure 5B:
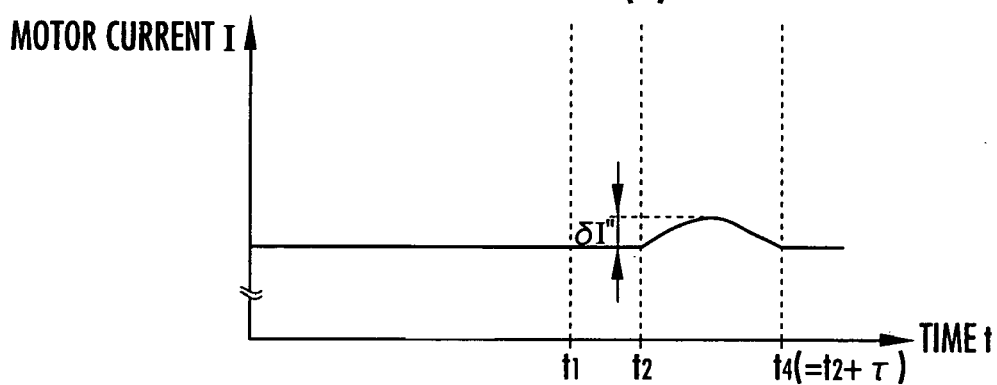
Figure 5C:
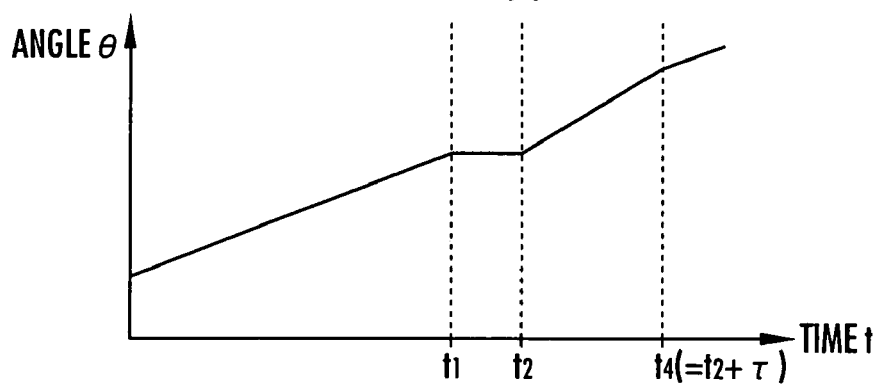

In addition, as shown in FIG. 5A, when the speed gain $K_v$ is corrected from time $t_2$ until the corrected duration $\tau$, as shown in FIG. 5B, the motor current I is controlled so that it is smoothly lowered after rising from time $t_2$ by $\delta I'$ for the corrected duration $\tau$ and it is returned to the initial value $K_0$.

Thereby, the walking operation of the robot 200 is controlled so that each joint angle $\theta$ thereof coincides with the secondary desired angle $\theta_{T2}$, and further, the primary desired angle $\theta_{T1}$.

Upon walking of the robot 200, it is likely that a noise is generated since the driving system electric line and the control system electric line are shaken or the first and second communication lines are shaken by a floor reaction caused when the lower limb (leg body) 210 connects ground. In addition, it is likely that a noise is generated due to the influence of static electricity and a potential of the place where the leg portion 210 contacts the ground. Further, as described above, in the robot 200, particularly, at the hip joint 211, the knee joint 212, and the shoulder joint 221, the communication line, the first and second communication lines (refer to a broken line in FIG. 1), the driving system electric line (refer to a bold line in FIG. 1) and the control system electric line (refer to a solid line in FIG. 1) are lined close to each other. Therefore, it is also likely that the abnormality is generated in the communication in the first and second communication lines, particularly, at the hip joint 211 and the knee joint 212 due to the influence such as the shock and the noise or the like generated upon walking of the robot 200. In the case that the abnormality is generated in the first communication line, it is likely that the secondary desired angle $\theta_{T2}$ stored and held by the first sub-control unit 121 is largely changed thereby making the control of the robot 200 unstable. In addition, if the abnormality is generated in the output signal of the sensor 131 or the communication of the second communication line, the newest physical amount in accordance with the output signal of the sensor 132 stored and held by the main control unit 110 is largely changed, and it is likely that the primary desired angle $\theta_{T1}$ itself set by the main control unit 110 is largely changed thereby making the control of the robot 200 unstable. Accordingly, it is highly necessary that the walking operation of the robot 200 is appropriately controlled.

Figure 6C:
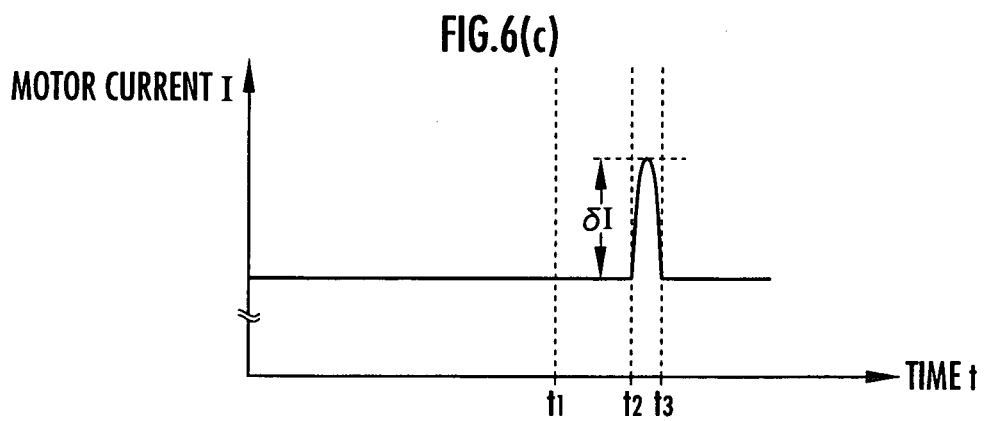
Figure 6D:
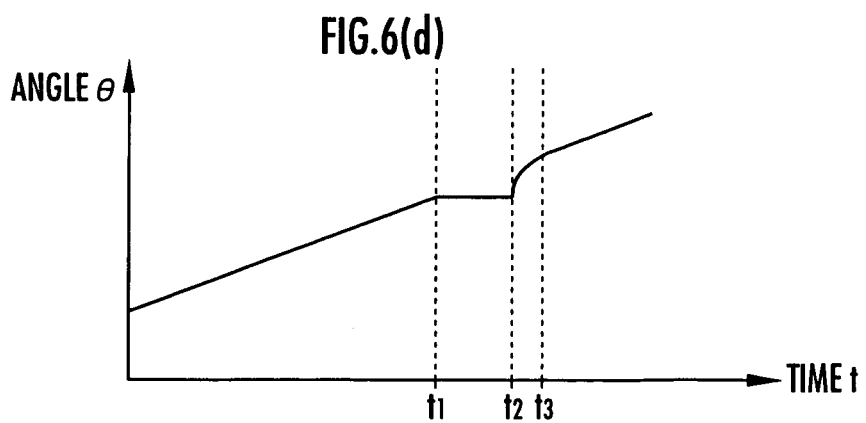

According to the control system of the present invention for executing the above-described function, when the absolute value of the variable $\delta$ (=the changing amount of the secondary desired output) is largely changed so as to exceed the threshold $\epsilon$, in accordance with the volume of the variable $\delta$, the corrected duration $\tau$ of the motor current I is set (refer to S106 in FIG. 4). In addition, the speed gain $K_v$ is corrected for the corrected duration $\tau$ (refer to S109 in FIG. 4 and FIG. 5A). Thereby, even when the abnormality is temporarily generated in the communications in the first and second communication lines between the main control unit 110 and the first sub-control unit 121 and the absolute value of the variable $\delta$ exceeds the threshold $\epsilon$, as shown in FIG. 6C and FIG. 6D, the rapid change of the motor current I and the joint angle θ is gently inhibited for a sufficiently long period of time (refer to S110 in FIG. 4, FIG. 5B, and FIG. 5C). Therefore, even when a communication abnormality is generated from the floor reaction received by the leg upon contacting the ground, or the electric potential of the leg at the ground contacting region and the like, the current I supplied to the motor 131 is inhibited from changing excessively, so that the movement of the lower limb (leg) 210 using the motor 131 as the source of power, and the walking movement of the robot (moving body) 200 can be appropriately controlled from the viewpoint of the stability of walking.

Further, the determination result by the determining portion 102 that the absolute value of the variable δ exceeds the threshold ε is noticed to the user through the unit 150 (refer to S111 in FIG. 4). Accordingly, it is possible to make the user be aware of the abnormality generated in the first communication line and to urge the user to solve this abnormality such as adjustment of the wiring condition of this first communication line.

Figure 2:
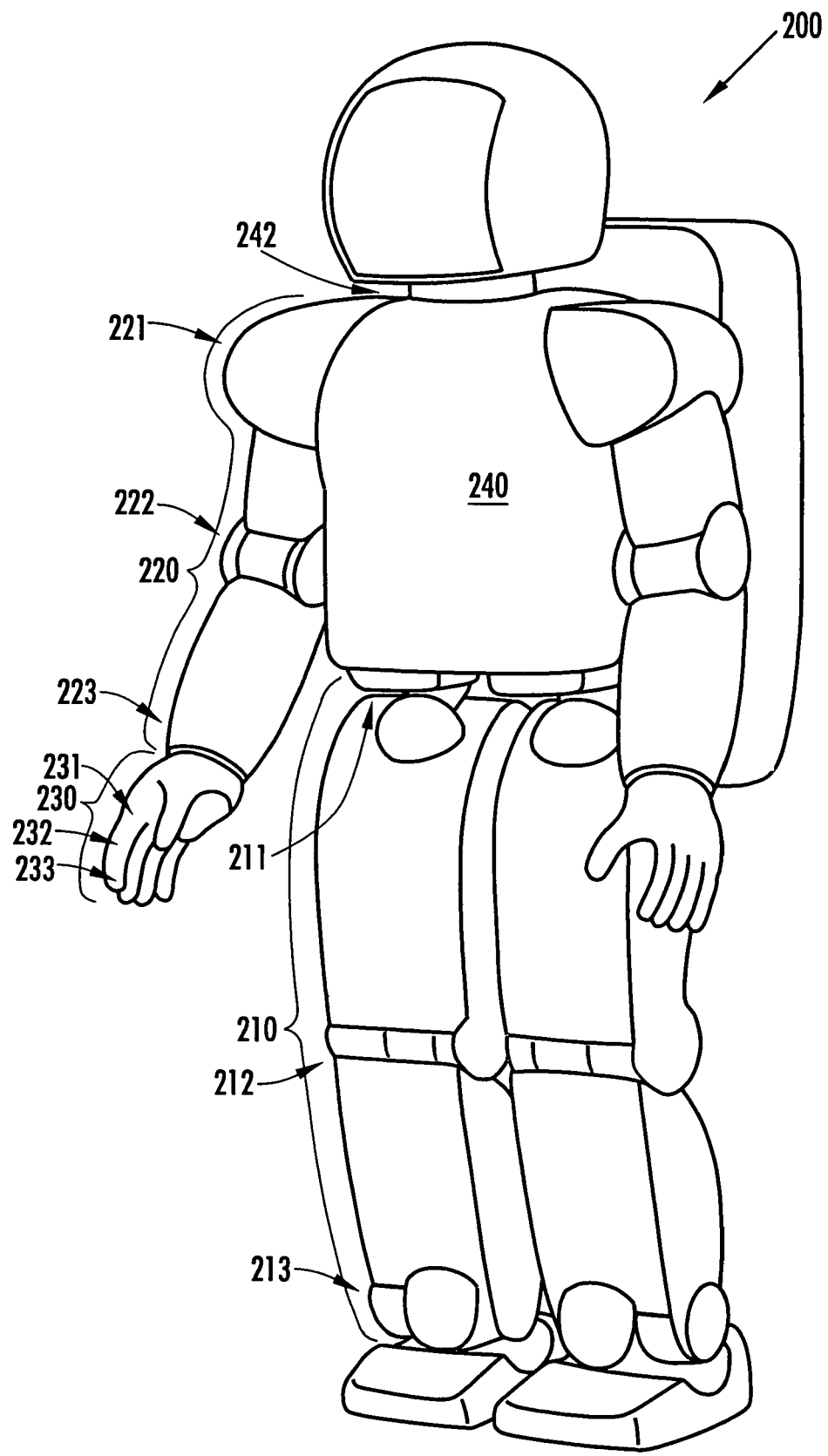
FIG. 2 is an explanatory block diagram of a robot, which is a control object of the control system according to an embodiment of the present invention.

According to the above-described embodiment, the moving body is defined as the robot 200 shown in FIG. 2, however, according to other embodiment, any machine and apparatus having a joint to be stretched and flexed using the motor as the source of power such as a robot for construction provided with an arm may be used.

According to the above-described embodiment, each joint angle θ is set as the primary desired angle by the main control unit 110, however, according to other embodiment, the angle speed ω (=dθ/dt) of each joint and the torque T around the joint may be set as the primary desired output by the main control unit 110.

According to the above-described embodiment, by correcting the speed gain $K_v$, the rapid change of the motor current I is inhibited (refer to FIG. 3, S109 and S110 in FIG. 4, FIG. 5A, and FIG. 5B), however, according to other embodiment, the change of the motor current I may be inhibited by alternatively or additionally correcting the positional gain Kp and the current gain $K_i$.

In the present embodiment, the changing amount δ of the secondary desired angle $θ_{T2}$ is measured as the "variable" (refer to expression 1), however, a deviation between the joint angle θ measured by a rotary encoder (not shown) as the sensor 132 and the primary desired angle $θ_{T1}$ may be measured as the "variable", and the speed gain $K_v$ and the like may be corrected on the basis of the variable (refer to expression 2), as another embodiment. Moreover, the changing amount of the secondary desired current (secondary desired output) of the current (output) I of the motor, or the deviation between the current (measured output) I of the motor 131 measured by a current sensor (not shown) as the sensor 132 and the primary desired current (primary desired output) thereof may be measured as the "variable", and the speed gain $K_v$ and the like may be corrected on the basis of the variable (refer to expression 2), as another embodiment.

What is claimed is:

1. A moving body equipped with a motor as a source of power, an output measuring means for measuring an output of the motor, and a control system having a plurality of control units to execute functions by a power supplied from a control system power source via a control system electric line, the control system including, as the control units, a main control unit for sequentially setting a primary desired output of the motor; and a first sub-control unit for receiving a primary desired output from the main control unit via a first communication line, storing and holding the newest primary desired output as a secondary desired output, and adjusting a power supplied from a driving system power source to the motor via a driving system electric line so that the output of the motor coincides with the newest secondary desired output, comprising:

variable measuring means for measuring the changing amount of the secondary desired output or a deviation between an output of the motor measured by the output measuring means and the newest primary desired output set by the main control unit as a variable;

determining means for determining whether or not an absolute value of the variable measured by the variable measuring means exceeds a threshold; and correcting means for correcting a power supply from the driving system power source to the motor to be adjusted by the first sub-control unit after the determining means determines that the absolute value of the variable exceeds the threshold in order to inhibit the changing amount of the power supply.

2. The moving body according to claim 1, wherein the correcting means sets a correction duration of the power supply to the motor in accordance with the volume of the variable measured by the variable measuring means.

3. The moving body according to claim 1, wherein the correcting means sets a correction amount of the power supply to the motor based on the absolute value of the variable measured by the variable measuring means.

4. The moving body according to claim 1, comprising notification means for notifying a user of a determination result by the determining means that the absolute value of the variable exceeds the threshold.

5. The moving body according to claim 1, comprising, as a control unit, a second sub-control unit for receiving an output signal in accordance with the physical amount of the moving body from the sensor and transmitting the output signal to the main control unit via a second communication line; wherein the main control unit receives the output signal of the sensor from the second sub-control unit, stores and holds the physical amount in accordance with the output signal, and sequentially sets the primary desired output based on the newest physical amount.

6. A legged mobile robot equipped with a base body, a plurality of legs extending from the base body, a motor as a source of power of the plurality of legs, a current measuring means for measuring a current of the motor, a control system power source, and a control system having a plurality of control units to execute functions by a power supplied from the control system power source via a control system electric line, the control system including, as the control units, a main control unit for sequentially setting a primary desired current of the motor; and a first sub-control unit for receiving a primary desired current from the main control unit via a first communication line, storing and holding the newest primary desired current as a secondary desired current, and adjusting a current supplied from a driving power source to the motor via a driving system electric line so that the current of the motor coincides with the newest secondary desired current, comprising:

variable measuring means for measuring the changing amount of the secondary desired current or a deviation between a current measured by the current measuring means and the newest primary desired current set by the main control unit as a variable;

determining means for determining whether or not an absolute value of the variable measured by the variable measuring means exceeds a threshold; and correcting means for correcting a current from the driving system power source to the motor to be adjusted by the first sub-control unit after the determining means determines that the absolute value of the variable exceeds the threshold in order to inhibit the changing amount of the current.

7. A control program embodied in a computer-readable medium for providing various functions to a moving body equipped with a motor as a source of power, an output measuring means for measuring an output of the motor, and a control system having a plurality of control units to execute functions by a power supplied from a control system power source via a control system electric line, the control system including, as the control units, a main control unit for sequentially setting a primary desired output of the motor; and a first sub-control unit for receiving a primary desired output from the main control unit via a first communication line, storing and holding the newest primary desired output as a secondary desired output, and adjusting a power supplied from a driving system power source to the motor via a driving system electric line so that the output of the motor coincides with the newest secondary desired output, comprising:

performing a variable measuring function for measuring the changing amount of the secondary desired output or a deviation between an output measured by the output measuring means and the newest primary desired output set by the main control unit as a variable;

performing a determining function for determining whether or not an absolute value of the variable measured by the variable measuring function exceeds a threshold; and performing a correcting function for correcting a power supply from the driving system power source to the motor to be adjusted by the first sub-control unit after the determining function determines that the absolute value of the variable exceeds the threshold in order to inhibit changing amount of the power supply.

8. The control program according to claim 7, for providing a function for setting correction duration of the power supply to the motor in accordance with the volume of the variable measured by the variable measuring function as a correcting function to the moving body.

9. The control program according to claim 7, for providing a function for setting correction amount of the power supply to the motor based on the absolute value of the variable measured by the variable measuring means as a correcting function to the moving body.

10. The control program according to claim 7, for providing a notification function for notifying a user of a determination result by the determining means that the absolute value of the variable exceeds the threshold to the moving body.

11. The control program according to claim 7, for providing said functions to the moving body, the control unit further comprising a second sub-control unit for receiving an output signal in accordance with the physical amount of the moving body from the sensor and transmitting the output signal to the main control unit via a second communication line; wherein the main control unit receives the output signal of the sensor from the second sub-control unit, stores and holds the physical amount in accordance with the output signal, and sequentially sets the primary desired output based on the newest physical amount.

12. The control program according to claim 7, for providing the variable measuring function, the determining function, and the correcting function to the first sub-control unit of the moving body.

13. A control program embodied in a computer-readable medium for providing various functions to a legged mobile robot equipped with a base body, a plurality of legs extending from the base body, a motor as a source of power of the plurality of legs, a current measuring means for measuring a current from the motor, a control system power source, and a control system having a plurality of control units to execute functions by a power supplied from the control system power source via a control system electric line, the control system including, as the control units, a main control unit for sequentially setting a primary desired current of the motor; and a first sub-control unit for receiving a primary desired current from the main control unit via a first communication line, storing and holding the newest primary desired current as a secondary desired current, and adjusting a current supplied from a driving power source to the motor via a driving system electric line so that the current of the motor coincides with the newest secondary desired current, comprising:

performing variable measuring function for measuring the changing amount of the secondary desired current or a deviation between a current measured by a current measuring means and the newest primary desired current set by the main control unit as a variable;

performing determining function for determining whether or not an absolute value of the variable measured by the variable measuring means exceeds a threshold; and performing correcting function for correcting a current from the driving system power source to the motor to be adjusted by the first sub-control unit after the determining means determines that the absolute value of the variable exceeds the threshold in order to inhibit the changing amount of the current.

* * * * *